(12) United States Patent
O'Shea et al.

(10) Patent No.: US 6,189,045 B1
(45) Date of Patent: Feb. 13, 2001

(54) DATA TYPE CONVERSION FOR ENHANCEMENT OF NETWORK COMMUNICATION SYSTEMS

(75) Inventors: Cynthia A. O'Shea, Lake Worth; Keith N. Fortenberry; Robert M. Szabo, both of Boca Raton; Sheldon I. Robertson, Boynton Beach; James J. Toohey, Boca Raton, all of FL (US)

(73) Assignee: International Business Machines Corp., Armonk, NY (US)

( * ) Notice: Under 35 U.S.C. 154(b), the term of this patent shall be extended for 0 days.

(21) Appl. No.: 09/048,748

(22) Filed: Mar. 26, 1998

(51) Int. Cl.[7] ........................................ G06F 17/30
(52) U.S. Cl. ..................... 709/246; 709/219; 707/102; 707/530
(58) Field of Search ................... 709/201, 217, 709/219; 395/614, 605, 705; 379/89, 93.01; 707/4, 201, 102, 530; 704/8; 705/4; 364/14.006; 380/9; 370/393; 55/61

(56) References Cited

U.S. PATENT DOCUMENTS

| | | | |
|---|---|---|---|
| 5,506,902 | * | 4/1996 | Kubota ........................................ 380/9 |
| 5,717,914 | * | 2/1998 | Husick et al. ........................ 395/605 |
| 5,740,231 | * | 4/1998 | Cohn et al. ............................. 379/89 |
| 5,742,598 | * | 4/1998 | Dunn et al. ........................... 370/393 |
| 5,742,905 | * | 4/1998 | Pepe et al. ............................. 455/461 |
| 5,757,669 | * | 5/1998 | Christie et al. .................. 364/14.006 |
| 5,781,911 | * | 7/1998 | Young et al. .......................... 707/201 |
| 5,787,386 | * | 7/1998 | Kaplan et al. ............................ 704/8 |
| 5,794,030 | * | 8/1998 | Morsi et al. ......................... 395/614 |
| 5,862,325 | * | 1/1999 | Reed et al. ............................ 709/201 |
| 5,890,129 | * | 3/1999 | Spurgeon .................................. 705/4 |
| 5,898,761 | * | 4/1999 | McHale et al. .................... 379/93.01 |
| 5,903,859 | * | 5/1999 | Stone et al. ............................... 704/8 |
| 5,911,776 | * | 6/1999 | Guck ..................................... 709/217 |
| 5,924,089 | * | 7/1999 | Mocek et al. ............................. 707/4 |
| 5,950,005 | * | 9/1999 | Elbers et al. ......................... 395/705 |
| 6,035,302 | * | 3/2000 | Tonouchi .............................. 707/102 |
| 6,055,551 | * | 4/2000 | Heinlein et al. ..................... 707/530 |
| 6,094,684 | * | 7/2000 | Pallmann ............................. 709/227 |

* cited by examiner

*Primary Examiner*—Le Hien Luu
*Assistant Examiner*—Thong Vu
(74) *Attorney, Agent, or Firm*—Quarles & Brady LLP

(57) ABSTRACT

A method of enhancing network communications that provides conversion of data type, including language translation, between data producing and data consumers desiring to collaborate in a language or other data format different than the host language or data format. A conversion manager can receive producer data, sucn as topic threads, from a data provider and convert, either internally or through remote conversion engines, to a preferably preselected format for republication over the network to subscribing data consumers.

24 Claims, 2 Drawing Sheets

DATA TYPE CONVERSION FOR ENHANCEMENT OF NETWORK COMMUNICATION SYSTEMS

FIELD OF THE INVENTION

The invention relates to network communications. More particularly, the invention relates to data conversions in a network system.

BACKGROUND OF THE INVENTION

As depicted in FIG. 1, in a traditional network data delivery model, participants can be characterized as data producers and data consumers. Data producers are generally those that generate content, and data consumers are those that are interested in that content. This data delivery relationship may be short term or ongoing; it may also be subscription based. Also, participants may change roles from data producers to data consumers and vice versa, as the need may be, and thereby establish a collaborative environment.

Traditionally, multiple user participation or collaboration in database use and enhancement has occurred using a common data type and format. All participants are required to communicate with the database, and thus, each other, in a common data type such as English text.

This confined communication vehicle exists, for example, in forum discussion group databases. Organized dialogue between multiple users on a network, such as the Internet, can be accomplished though discussion groups, which are also called forums. Common discussion groups on the Internet presently are the USENET news groups, and online services typically host similar forum services.

In these network-based discussion groups, a user "posts" an article, which is distributed to the user's host computer and sent out over the network. The Unix-to-Unix Copy (UUCP) mechanism is typically used to perform this function.

Each forum has a system for asynchronous collaboration, by arranging the subject matter in a forum hierarchy. Each forum consists of one or more categories. In a heart disease forum, for instance, one might find categories named "Bypass surgery" or "Angioplasty." The categories organize material within a forum, similar to headings in a book.

Within each category, one would find "topics" related to that category. The exemplary "Bypass surgery" category might have topics such as "Preparing for bypass surgery" or "Recovering from bypass surgery." Topics can include online articles or messages, which are also referred to as "posts."

A topic might present an opinion, provide information, or pose a question. In the topic "Recovering from bypass surgery," for example, a recent patient might describe what recovery was like so that others considering surgery would know what to expect.

Topics, whether they pose questions or not, might elicit responses from other forum participants. A user reading the "Recovering from bypass surgery" topic might have had a very different recovery experience. The user might feel compelled to write a response ("My experiences were different") to the topic. Another user might write a response agreeing with the topic ("My experience was the same as yours").

The forum also permits responses to responses, responses to those responses, and so on. All messages related to a single topic create what is known as a thread.

As shown in FIG. 2, in a discussion group, data consumers add value to data received when they respond, and as a result, a type of multilevel value-added chain is created in the process of producing data.

However, even these organized forums and value-added data chains have been limited to a single language, typically English, and have traditionally been restricted to text exchanges. Thus, participation is limited to those who can communicate in that text and language. Data producers and data consumers must use the same language.

SUMMARY OF THE INVENTION

It is therefore an object of the invention to expand and enhance collaboration in database use and development.

It is a further object of the invention to permit data producers to enhance databases with a plurality of data types, including text of different languages, graphics and audio.

It is another object of the invention to provide a network communication system in which data consumers can participate in forum discussions in different languages and in different data formats.

It is another object of the invention to provide a network communication system that facilitates international collaboration on issues of worldwide concern.

It is a further object of the invention to provide a network communication system that enables discussion group participation by physically challenged data consumers.

These and other objects of the invention are provided by a communication system in which multi-type conversion of data is performed between data producers and data consumers over a network. The invention provides a method to enhance group participation in the development of a database of information, such as a forum discussion group, through data type conversions over at least one network.

As used throughout, data type is intended to connote the nature of information from the perspective of the user, such as graphics, audio, video, text as well as variations in format among these media forms. A difference in data type may also include use of different natural language in text, spoken language, audio and the like.

The network includes at least one data producer sending data in a producer data type over the network and data consumers desiring to retrieve the data in consumer data types different than or the same as the producer data type. In the inventive method, a conversion manager, having appropriate server hardware and software, receives data over at least one network from a data producer, said data having a producer data type. The data having the producer data type is then preferably converted to consumer data having a consumer data type different than the producer data type format, and the consumer data is published over at least one network to at least one data consumer different than the data producer. Of course, the system can simultaneously accommodate data consumers who wish to use the same format as the data producers.

According to an aspect of the invention, the multi-type conversion can be performed in connection with the generation and update maintenance of replicated databases. The producer can provide data that is converted in its entirety to the consumer data type in a replicated database. Alternatively, the data can be provided in the producer data type and converted as needed when accessed by a data consumer desiring to operate in a different data type.

The inventive method can include receiving further data from the consumer in the consumer data type and updating the replicated database with the further consumer data.

When the replicated database having the consumer data type is synchronized with the original producer database, reciprocal conversion of the update data between the two databases is preferably undertaken.

According to the invention, the conversion manager can further receive from the data consumer over at least one network identification of the consumer data type to which the data is to be converted. This information can be stored by the conversion manager in a consumer profile and data can be retrieved and converted in response to this information.

The consumer can send over at least one network further consumer data having a reply consumer data type different than the producer data type. This reply information can be converted to further producer data having the producer data type, either before or after integration into the replicated database.

The producer data and the consumer data can be exchanged over different networks and different time zones.

The conversion process of the invention can have particular applicability in enhancing multi-type user participation in forum group discussions. In this implementation, the producer data type preferably includes a first natural language and the consumer data type preferably includes a second natural language, but the producer data type can also include one of text, audio information, graphic information and video information and the consumer data type can include one of text, audio information, graphic information and video information different than the producer format.

The network communication systems can publish lists of available forums and available data types, including different languages, for selection by subscribing data consumers.

The conversion engine can be resident with the conversion manager, and a plurality of different conversion engines can be available. Some engines may be remote, and the conversion process can include transmission over a network of the producer forum data to a second, remote conversion manager, which in turn converts and returns the forum data to the first conversion manager for publication or further conversion.

BRIEF DESCRIPTION OF THE DRAWINGS

A more thorough understanding of the invention can be gained from a reading of the following detailed description, together with a review of the accompanying drawing, in which.

DETAILED DESCRIPTION OF INVENTIVE EMBODIMENTS

The invention is directed to a system for enabling data consumers to receive information from data producers and participate in collaborative database development in a data type such as audio, video, graphic or traditional text selected by each consumer. While the consumer data type can be the same as the producer data type, as in traditional systems, the inventive system also provides for a consumer data type different than the producer data type. The data type may also include different natural language versions of text. While exemplary embodiments of the invention are described with reference to translation of natural language in text messages for use in network discussion groups, it should be understood that the scope of the invention extends to other type conversions, such as from text to spoken language audio, and vice versa. Visually-based communications, such as graphic images and video, can be converted, and with developing technology, conversion between visually based communications and textual or audio communications may also be possible. Data type is intended to refer generically to its communicative characteristics, that is, the natural language in which it is written and reviewed as well as the medium in which it is expressed, such as text, graphic, audio or video, and the file format convention followed.

The communication system of the invention can be employed with any network environment, including the Internet and internal, restricted-access organizational computer networks. The system can be applied for communications involving multiple interconnected networks as well. The term "at least one network" refers to not only an individual dedicated network between the data producer and data consumers, but also networks of networks, such as the Internet or World Wide Web on a large scale, and private wide area network of local area networks on a smaller scale.

Figure 1:
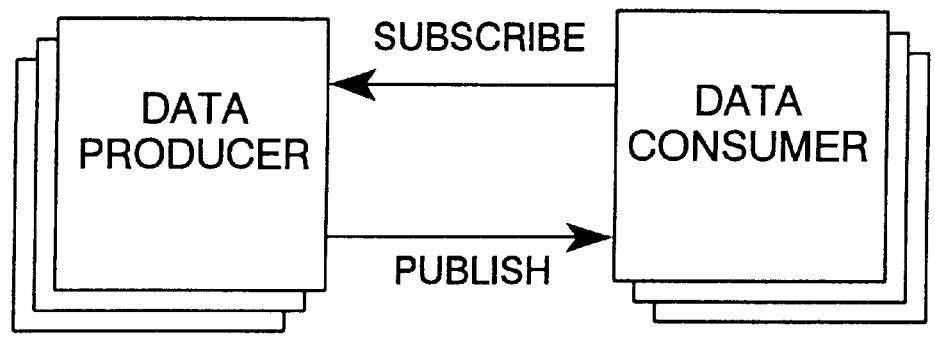
FIG. 1 illustrates a traditional data delivery model of the prior art.
Figure 2:
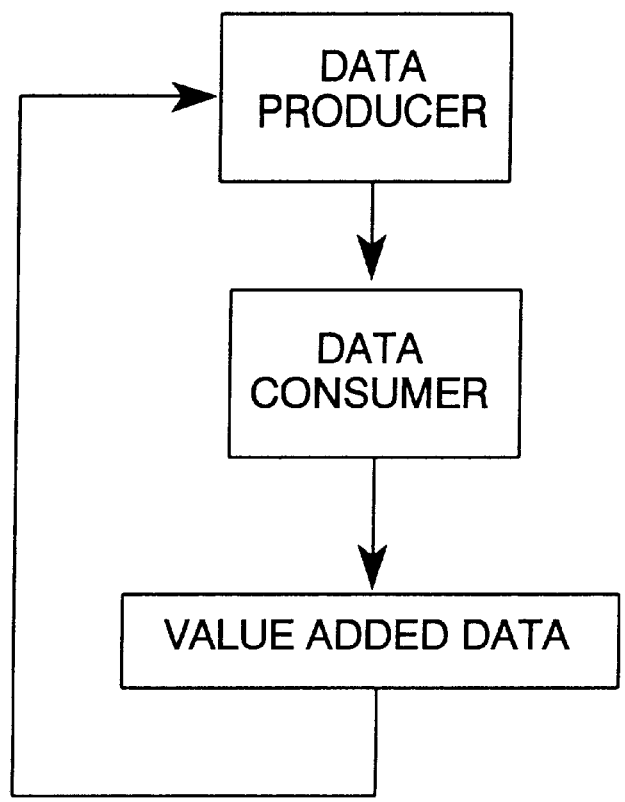
FIG. 2 illustrates a multilevel value-added data chain of the prior art.
Figure 3:
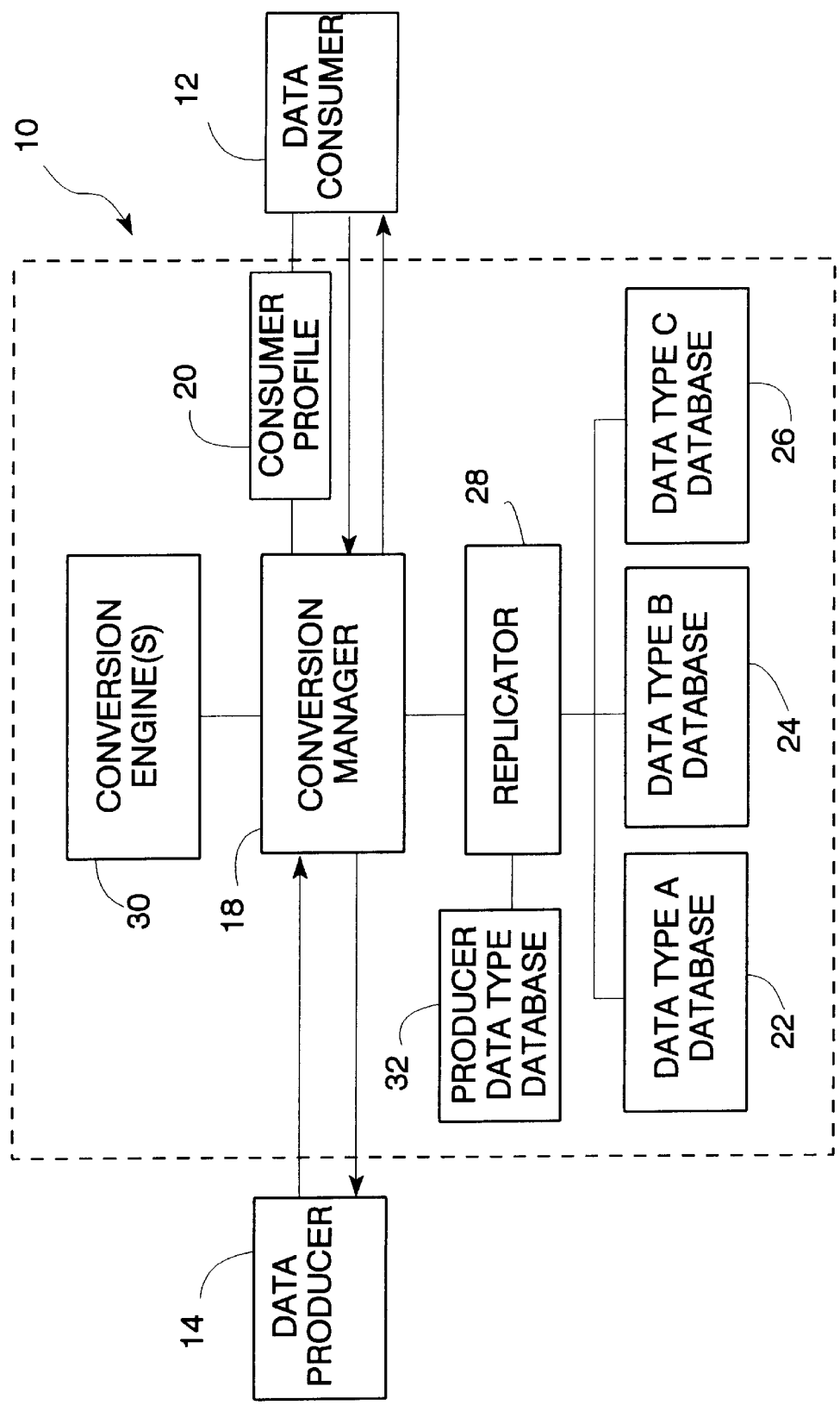
FIG. 3 illustrates a multi-type publish and subscribe network communication model according to an embodiment of the invention.

Referring to FIG. 3, a multi-type publish and subscribe network communication system 10 according to the invention can be used to enhance participation in database development or collaboration by one or more data consumers 12 desiring, or only able, to communicate in languages or other data types different than the language or data type of a data producer 14. A single data producer and a single data consumer are shown for clarity of illustration. However, it is envisioned that a network communication system according to the invention would interact with a large number of users. Moreover, the user status as either a consumer or producer is itself dynamic and changes as the user either receives or sends data relative to other users.

One embodiment of the inventive method includes the conversion of forum discussion data to different languages for use by consumers understanding different natural languages. Forum content or data can be created and sent over a network, such as the Internet, by a data producer 14. The data producer 14 may be a user like the data consumer 12, or the data producer 14 may simply provide data to the network communication system 10. The forum data is sent in a producer language and format, such as English text. The producer forum data is received by a conversion manager 18 equipped to convert the English language data to one or more different languages or data types, preferably in accordance with previously identified preferences of the data consumer 12 stored in a consumer profile 20. The converted information can then be sent over the network to the data consumer 12 in her desired language or data type.

Alternatively and preferably, the forum data from the data producer 14 is converted and integrated into one or more converted databases 22, 24, 26. Each converted database 22, 24, 26 can be a replication using replication technology referred to here as a replicator 28, in a converted data type, of a corresponding database 32 in the producer data type. The network communication system 10 can manage a large number of converted databases, the three illustrated only being an example.

The data conversion can be performed in a variety of ways. The conversion manager 18 can include one or more conversion engines for translating from the producer language to the consumer languages of the converted databases 22, 24, 26. A number of different language conversion engines 30 can be resident with the conversion manager 18. Alternatively, the conversion manager 18 can publish the forum data from the producer 14 over the network to another server or servers that house the conversion engines 30 for the desired language or data type. The remotely converted data can then be retrieved by the conversion manager 18 and either further converted or published to the data consumer 12.

The conversion engines 30 can be viewed as "black boxes" that accept a language or data type for conversion to another language or data type, for example, English text to Spanish. However, the "black box" may be any type of conversion technology, for example, written English to spoken Spanish, or motion picture to still frame graphics.

The conversion step of the invention can be utilized to perform any of a number of conversions to bring data in a language and format that is desired by the data consumer 12. Other data format conversions besides language text translation could include conversions of text and document formats (txt, doc, html, sgml, TeX, LaTeX, TROFF or pdf), graphic formats (GIF, JPG, DIB, GIF89, PNG, TIFF, BMP, or VRML), compression formats (gzip, zip, tar, arc, zoo), sound formats (wav, au or midi) and video formats (mov, avi, mpeg, or dvd). These formats are only examples, and other format changes could also be made within the scope of the invention. Conversions may occur between homogeneous file types in each category. Conversions may also include heterogeneous types, for example, text to speech, speech to text, video to audio, and audio to text. File formats that contain both audio and video could be converted to audio or text. Video could be converted to stills, and a still graphic could be converted to an audio or text description of a scene. These formats are merely examples, and any data type conversions could be offered as conversion technology develops and permits.

For example, existing technology for converting text from one language to another can be adapted for use in the conversion system of the invention. For example, Globalink® (www.globalink.com) presently produces a product referred to as Globalink Power Translator®. This translator operates in either a browser or word processor platform. To perform a draft translation in a word processor, the user highlights text to be translated, then issues the command to complete the translation process. Both individual words and grammar are converted from a first language to a second language. This known conversion technique is limited to manual selection of text to be converted. In an aspect of the invention, the conversion manager is significantly different, in that conversion occurs automatically and occurs for both data received by the data consumer and response data sent by the consumer.

Multilingual forums offered by network communication systems would utilize the conversion function as a "black box." A first language is the input and a second language is the output. The algorithms used to perform the conversion function can be isolated within the conversion system. As noted above, a significant difference with respect to existing translator applications is the automated processing of data conversion compared to the manual selection of text in a word processor or browser environment.

A data consumer can choose to participate in multilingual forums preferably through a subscription-based process. Each data consumer preferably identifies over the network to the network communication system the forum she wishes to participate in, the preferred data types, such as languages, and optionally billing information if the network communication system bills for its services. The information is preferably maintained in the user profile stored by the network communication system, and conversions can be performed in accordance with these stored preferences. Utilizing replication or a similar process, which duplicates and synchronizes databases in disparate locations, the network communication system can deliver the converted and synchronized content to the data consumer based on her profile information. The data consumer may wish to respond to a forum topic by posting a message, stating, for example, her opinion on a given topic. The data consumer may alternatively pose new topics, which might elicit responses from other forum participants. Forum data from the consumer, such as topic responses or queries, can be published in any of a variety of data types, including different formats or languages. Typically, the forum data from the consumer is sent over the network by the consumer in the same preferred language in which she received forum data from the conversion manager. However, the consumer can opt to publish her further forum data in a different language or data type. For example, she may wish to respond with an audio or video file.

The conversion manager receives the further forum data from the consumer which can also be referred to as value added data, and converts the further forum data back to the data type or language of the original data producer or of the replicated database with which the conversion manager is associated. The conversion manager may also convert the incoming value added data to other languages or data types according to the preference profiles of other data consumers subscribing to the network communication system.

The network communication system can include a system for monitoring the conversion transaction and compensating the conversion manager for its services. Billing arrangements are defined and managed by the network communication system, that may choose to use an event, period based or flat rate billing model.

Internet Service Providers (ISP's) can also take advantage of the network communication system. ISP's typically provide a variety of network communication and information services. These services vary from ISP to ISP and include Internet access, email, web site creation and content hosting. An ISP can provide multitype data conversion as a further service.

In this ISP environment, the relationship between the conversion manager and the data consumer may be further decoupled. The ISP could match conversion managers and data consumers. In this case, the ISP is viewed as the first level data consumer who subscribes to the network communication system.

The ISP can operate servers and redistribute the converted content to its customers. The ISP can also manage its customers' profiles and individual billing arrangements for the network communication system.

The multilingual publish and subscribe network communication model requires two key mechanisms. The key mechanisms are message synchronization and message conversion organized by type and thread. Synchronization may be accomplished by replication. Message conversion is accomplished by using state of the art conversion engines.

Replication is the ability to duplicate and synchronize databases in disparate locations. Replication enables data consumers on different networks, even in different time zones or different countries, to share the same information in a timely and in an effective manner. Two-way replication assures that any value-added data is also replicated as the replication cycle continues.

The communication protocol between the data producers, data consumers and the conversion managers should include traditional components used in existing forum content and message exchanges. Additionally, the protocol should identify the source type, request type and the Coordinated Universal Time (UTC) stamp. The source type will identify the data type format or language of the data being published. The request type or types can identify the data format, type or language the requester wishes to "pull." The UTC time stamp can be provided to ensure that only new items are "pushed" or "pulled" in a synchronized manner.

Conversion managers could share or transfer requests to other conversion managers to balance synchronization and conversion loads. Conversion managers may be considered multi type capable.

Details of preferred embodiments of the invention have been set forth to aid in an understanding of the invention and its applications. However, the details provided are not intended as limiting the scope of the invention. The data conversion techniques of the invention have application beyond the forum discussion group participation illustrated. Conversion between stock exchange databases to reflect financial information in different monetary units, using currency exchange rates, is an example. Similarly, the network communication system can implement parallel changes in different natural languages as the context language of a master database, such as the audio of a motion picture, is edited. Thus, reference should be made to the accompanying claims for a determination of the proper scope of the invention.

What is claimed is:

1. A method for enhancing data type conversion for network communications, comprising the steps of:
   identifying and storing data-tpye preferences of data consumers;
   receiving producer data in a multi-type publish and subscribe network communications system over at least one network from a data producer, said producer data having a producer data type;
   storing said producer data in a producer data type database in said multi-type publish and subscribe network communications system;
   converting the producer data to consumer data having a consumer data type different than the producer data type in said multi-type publish and subscribe network communications system, said consumer data-type being consonant with one of said identified and stored data-type preferences, said at least one data consumer being different than the data producer;
   replicating the producer data type database in a replicated database in the consumer data type in said multi-type publish and subscribe network communications system; and
   sending the consumer data from said multi-type publish and subscribe network communications system over at least one network to said at least one data consumer,
   said multi-type publish and subscribe network supporting a network-based discussion croup, said discussion group including a system for asynchronous collaboration, said system for asynchronous collaboration arranging subject matter in a hierarchy, said system for asynchronous collaboration accepting posts of producer data, said system for asynchronous collaboration providing said posts of producer data in the form of consumer data to consumers interacting with said multi-type publish and subscribe network-based discussion group database system.

2. The method according to claim 1, further comprising the steps of:
   receiving from a consumer over at least one network in said multi-type publish and subscribe network communications system further consumer data having a reply consumer data type different than the producer data type;
   updating said further consumer data to the replicated database in said multitype publish and subscribe network communications system;
   synchronizing the replicated database with the producer data type database in said multi-type publish and subscribe network communications system wherein said further consumer data is converted to further producer data having said producer data type.

3. The method according to claim 2, wherein the reply consumer data type is the same as the consumer data type of the consumer data.

4. The method according to claim 2, wherein the reply consumer data type is different than the consumer data type of the consumer data.

5. The method according to claim 1, wherein the producer data is a forum topic and the further consumer data is a response to the forum topic.

6. The method according to claim 1, wherein the producer data is a forum topic response and the further consumer data is a response to the forum topic response.

7. The method according to claim 1, wherein the producer data is a forum topic response and the further consumer data is a new forum topic.

8. The method according to claim 1, further comprising the steps of:
   receiving over at least one network in said multi-type publish and subscribe network communications system from the data consumer identification of the consumer data type to which the producer data is to be converted;
   storing in said multi-type publish and subscribe network communications system the consumer data type identification in a consumer profile;
   responsive to the consumer data type identification, converting in said multi-type publish and subscribe network communications system the producer data to consumer data having the consumer data type; and
   sending the consumer data over at least one network from said multi-tvpe publish and subscribe network communications system to the consumer.

9. The method according to claim 1, wherein the producer data and the consumer data are exchanged over different networks.

10. The method according to claim 1, wherein the producer data and the consumer data are exchanged over different time zones.

11. The method according to claim 1, wherein the producer data includes a first natural language and the consumer data includes a second natural language.

12. The method according to claim 1, wherein the producer data type includes one of text, audio information, graphic information and video information and the consumer data type includes one of text, audio information, graphic information and video information different than the producer data type.

13. The method according to claim 1, wherein the network includes the Internet.

14. The method according to claim 1, wherein the network includes an internal, restricted-access network.

15. The method according to claim 1, further comprising the steps of:

sending over at least one network a list of databases for selection by the data consumer.

16. The method according to claim 15, further comprising the steps of:

sending over at least one network a list of data types for selection by the data consumer.

17. The method according to claim 1, wherein the data consumer is an Internet Service Provider.

18. The method according to claim 1, wherein the converting step comprises:

sending the received producer data over at least one network from said multitype publish and subscribe network communications system to a converter for conversion of the producer data to converted data; and receiving over at least one network in said multi-type publish and subscribe network communications system the converted data.

19. The method according to claim 18, wherein the converted data is in the consumer data type.

20. The method according to claim 18, wherein the converted data is further converted to the consumer data type.

21. The method according to claim 1, further comprising the steps of:

receiving in said multi-tyDe publish and subscribe network communications system a plurality of producer data from a plurality of data producers, said plurality of producer data having at least two different producer data types;

converting in said multi-type publish and subscribe network communications system said plurality of producer data to a plurality of consumer data having at least two different consumer data types; and sending said plurality of consumer data from said multi-type publish and subscribe network communications system over the network.

22. The method according to claim 1, further comprising the steps of:

receiving from a consumer over at least one network in said multi-type publish and subscribe network communications system further consumer data having a reply consumer data type different than the producer data type;

converting in said multi-type publish and subscribe network communications system the further consumer data from the reply consumer data type to further producer data having the producer data type; and sending the further producer data from said multi-type publish and subscribe network communications system over at least one network.

23. The method according to claim 1, further comprising the step of:

providing the producer data type database containing initial data, prior to receiving data over a network from the data producer.

24. The method according to claim 1, wherein the producer data type database is replicated in the replicated database before the producer data is converted to consumer data.

* * * * *